United States Patent [19]

Budde et al.

[11] Patent Number: 4,503,534

[45] Date of Patent: Mar. 5, 1985

[54] APPARATUS FOR REDUNDANT OPERATION OF MODULES IN A MULTIPROCESSING SYSTEM

[75] Inventors: David L. Budde, Portland; David G. Carson, Hillsboro, both of Oreg.; Anthony L. Cornish, Essex, England; David B. Johnson; Craig B. Peterson, both of Portland, Oreg.

[73] Assignee: Intel Corporation, Santa Clara, Calif.

[21] Appl. No.: 393,905

[22] Filed: Jun. 30, 1982

[51] Int. Cl.³ .............................................. G06F 11/00
[52] U.S. Cl. ........................................ 371/9; 371/11; 364/200
[58] Field of Search ................ 364/200, 900; 371/11, 371/9, 10, 8

[56] References Cited

U.S. PATENT DOCUMENTS

| | | | |
|---|---|---|---|
| 4,015,246 | 3/1977 | Hopkins et al. | 371/9 |
| 4,191,996 | 3/1980 | Chesley et al. | 371/9 |
| 4,276,594 | 6/1981 | Morley | 364/200 |
| 4,347,563 | 8/1982 | Paredes et al. | 371/9 |
| 4,371,754 | 2/1983 | De et al. | 371/9 |
| 4,378,588 | 3/1983 | Katzman et al. | 364/200 |
| 4,412,281 | 10/1983 | Works | 371/9 |
| 4,438,494 | 3/1984 | Budde et al. | 371/11 |

Primary Examiner—Jerry Smith
Assistant Examiner—Michael R. Fleming
Attorney, Agent, or Firm—Owen L. Lamb

[57] ABSTRACT

A number of intelligent nodes (bus-interface units-BIUs and memory-control units-MCUs) are provided in a matrix composed of processor buses (105) with corresponding error-reporting and control lines (106); and memory buses (107) with corresponding error-reporting and control lines (108). Each node (100, 101, 102, 103) has means for logging errors and reporting errors on the error-report lines (106, 108). Processor modules (110) and memory modules (112) are each connected to a node which controls access to a common memory bus (107). Each node includes means (a married bit-170 and a shadow bit-172) for marrying modules in pairs such that each module in the pair tracks the operations directed to the module pair, and each module in the pair alternates with the other module in the handling of requests or replies. Each node registers the ID of the other node in a spouse ID register. Comparison logic (162, 164) in each node resets the married bit upon the condition that the node ID (identifying the node at which the error occurred) in an error-report message is equal to the ID stored in the spouse ID register, thus identifying the spouse node (the partner of the node in which the comparison logic is located) as the source of the error. Resetting the married bit splits apart the primary/shadow pair, so that the error-free module takes over and ceases to alternate with its partner.

7 Claims, 6 Drawing Figures

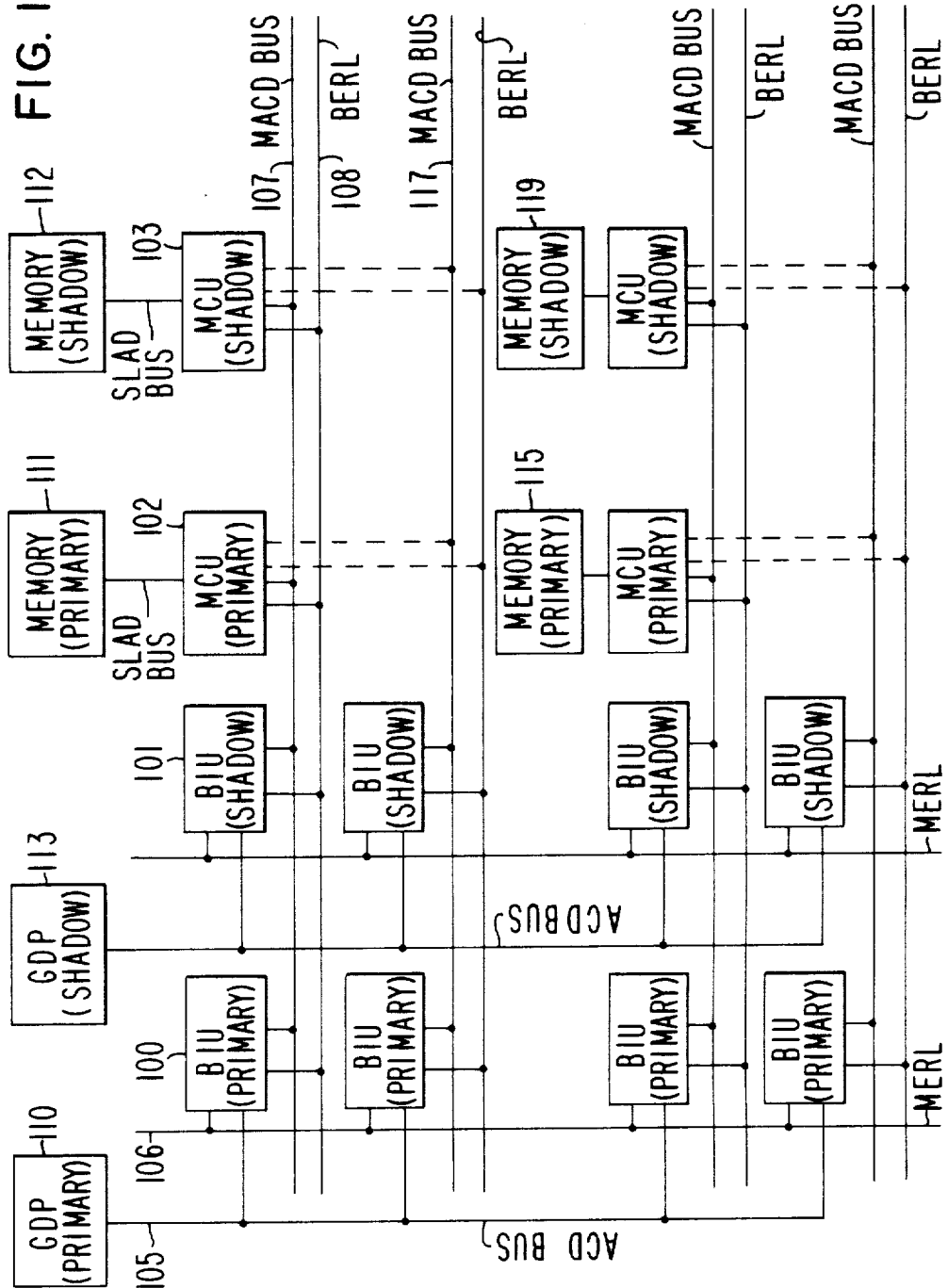

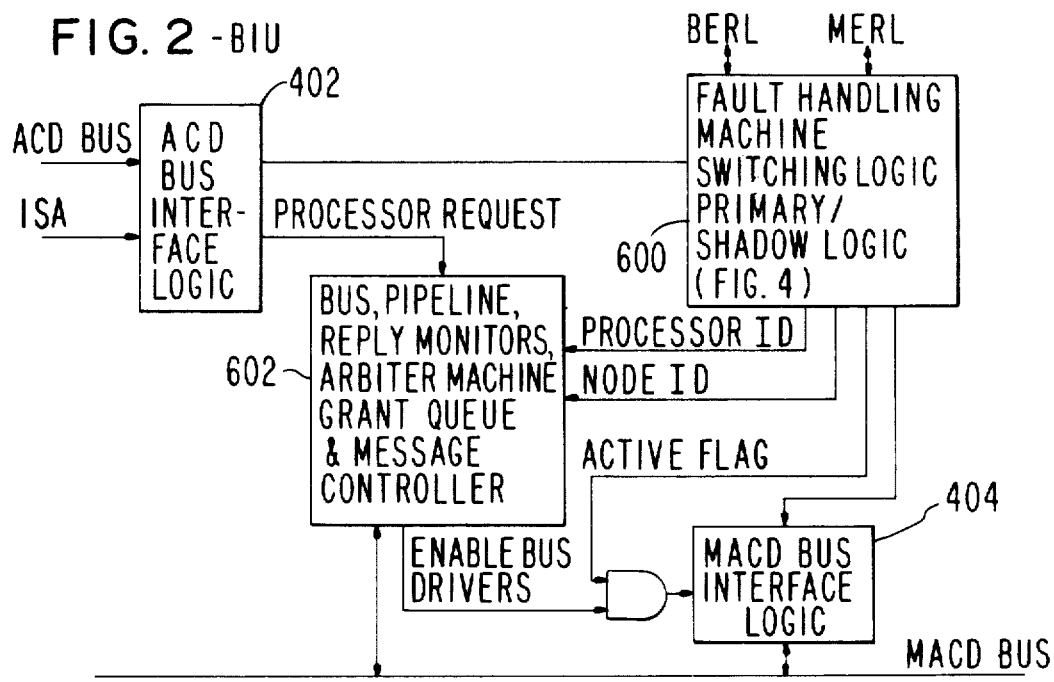
FIG. 2 - BIU
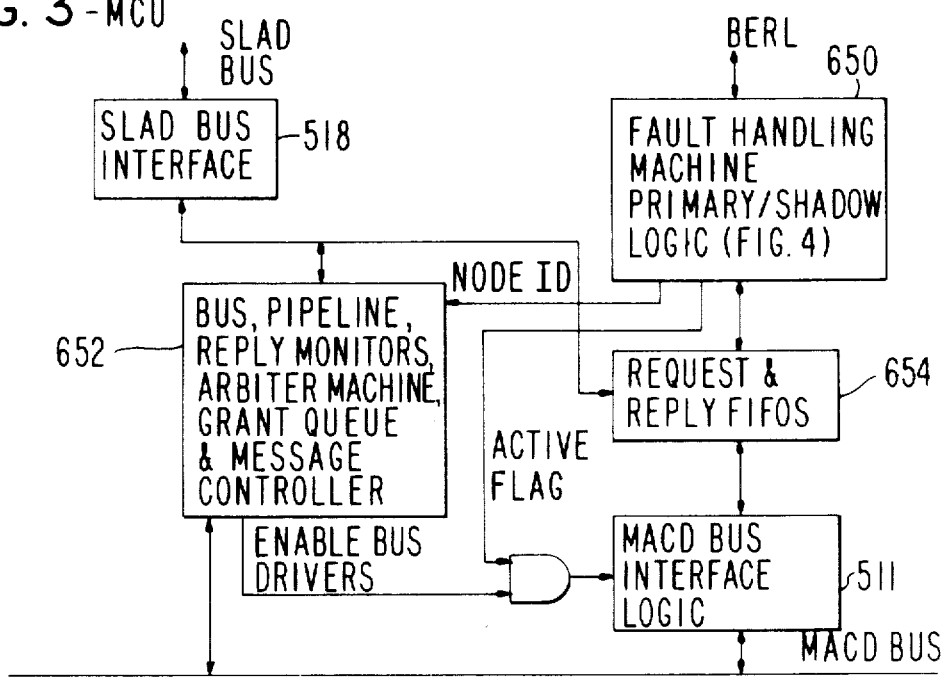
FIG. 3 - MCU

APPARATUS FOR REDUNDANT OPERATION OF MODULES IN A MULTIPROCESSING SYSTEM

CROSS REFERENCES TO RELATED APPLICATIONS

Application Ser. No. 290,135, now U.S. Pat. No. 4,402,046, (a continuation of Ser. No. 972,010, filed Dec. 21, 1978) entitled "Interprocessor Communication System," by George Cox et al., filed Aug. 5, 1981 and assigned to Intel Corporation.

Application Ser. No. 235,470, now U.S. Pat. No. 4,407,016, "Microprocessor Providing an Interface between a Peripheral Subsystem and an Object-Oriented Data Processor," of John A. Bayliss et al., filed Feb. 18, 1981 and assigned to Intel Corporation.

Application Ser. No. 296,025, now U.S. Pat. No. 4,438,494, "Method and Apparatus of Fault-Handling in a Multiprocessing System," by David Budde et al., filed on Aug. 25, 1981 and assigned to Intel Corporation.

Application Ser. No. 119,433, now U.S. Pat. No. 4,415,969, "Macroinstruction Translator Unit," of John A. Bayliss et al., filed on Feb. 7, 1980 and assigned to Intel Corporation.

Application Ser. No. 119,432, now U.S. Pat. No. 4,367,524, "Macroinstruction Execution Unit," of David Budde et al., filed on Feb. 7, 1980 and assigned to Intel Corporation.

Application Ser. No. 336,866, now U.S. Pat. No. 4,480,307, "Interface for use Between a Memory and Components of a Module Switching Apparatus" of David Budde et al., filed on Jan. 4, 1982.

Application Ser. No. 342,837, now U.S. Pat. No. 4,473,880, "Arbitration Means for Controlling Access to a Bus Shared by a Number of Modules" of David Budde et al., filed on Jan. 26, 1982.

Application Ser. No. 393,906, "Apparatus for Recovery From Failures in a Multiprocessing System" of David Budde et al., filed on June 30, 1982.

U.S. Pat. No. 4,176,258, "Method and Circuit for Checking Integrated Circuit Chips" of Daniel K. Jackson, granted Nov. 27, 1979 and assigned to Intel Corporation.

U.S. Pat. No. 4,315,308, "Interface Between a Microprocessor Chip and Peripheral Subsystems" of Daniel K. Jackson, granted Feb. 9, 1982 and assigned to Intel Corporation.

U.S. Pat. No. 4,315,310, "Input/Output Data Processing System" of John A. Bayliss et al., granted Feb. 9, 1982 and assigned to Intel Corporation.

U.S. Pat. No. 4,325,120 "Data Processing System" of Stephen Colley et al., granted Apr. 13, 1982, and assigned to Intel Corporation.

BACKGROUND OF THE INVENTION

1. Field of the Invention

This invention relates to multiprocessing systems and more particularly to means for operating identical redundant processors in parallel in order to recover from failures in one of the processors.

2. Description of the Prior Art

With the advent of Very Large-Scale Integrated (VLSI) circuit technology the cost of hardware components has been drastically reduced. The relatively low cost of hardware has made it feasible to duplicate whole processors so that one processor can be substituted for another processor should that processor become faulty. Redundancy is not new to the data processing art; however, there is a need for new methods and apparatus, uniquely adapted to the requirements of the new VLSI technology.

As described in the above-identified Budde, et al. application Ser. No. 296,025, now U.S. Pat. No. 4,438,494, fault-handling includes detection, diagnosis, logging, and reporting of the fault. System resources detect the presence and extent of the failure and pass this information on to recovery mechanisms. After fault detection, the recovery mechanisms are employed to activate redundant components to take over operations previously handled by the faulty component.

In the past, duplicate modules have been employed to provide redundant resources. For example, an identical redundant processor has been used in parallel with a primary processor and supplied with the same data and programmed instructions. The outputs of the two processors will be identical so long as they are operating without error. If an error occurs in one processor, its operation can be halted and the other processor substituted therefore without any loss of time. A serious drawback exists in prior systems, however. Assume that the substitute redundant processor has defective data paths, such as defective output drivers. This condition would not be detected while both processors are operating simultaneously, because good data would be supplied by the other primary processor, while it is operating error-free, overriding the bad data on the redundant processor. The defective drivers will only be noticed when the primary processor is taken out of service. Then the substitute processor will fail, too. It is therefore desirable to provide a redundancy system in which redundant modules are constantly being used in the system so that their circuits are subjected to periodic use while still maintaining a current backup resource.

It is therefore an object of the present invention to provide redundancy in a data processing system in which operations in a primary module are duplicated in a redundant (shadow) module with means for alternating the use of each module in the system, so that either module can immediately take over all operations when a fault occurs in the other module.

SUMMARY OF THE INVENTION

Briefly, the above objects are accomplished in accordance with the invention by providing a number of intelligent nodes in a matrix composed of processor buses with corresponding error-reporting and control lines; and memory buses with corresponding error-reporting and control lines. Each node has means for logging errors and reporting errors on said error-report lines. A primary module is connected to a primary node which controls access to a common memory bus. A shadow module is connected to a shadow node which controls access to said common memory bus. Each of said primary and shadow nodes comprise means (married, shadow, and active bits) operative when set to a first state for marrying said primary module and said shadow module in a primary/shadow pair such that each module in said primary/shadow pair tracks the operations directed to said primary/shadow pair, and such that each module in said primary/shadow pair alternates with the other module in the handling of requests or replies. When the means for marrying is set to a second state (married bit reset), it causes said module to be active on every access, and each module in said primary/shadow pair ceases to alternate with the other module in the handling of requests or replies.

In accordance with an aspect of the invention, each node includes means for registering the ID of the other node of said primary/shadow pair in a spouse ID register. Comparison means in said node sets said means for marrying to said second state upon the condition that the node ID (identifying the node at which an error ocurred) in an error-report message is equal to the ID stored in said spouse ID register, thus identifying the spouse node (the partner of said node in which the comparison logic is located) as the source of the error. In this manner the error-free module takes over and ceases to alternate with its partner.

In accordance with a further aspect of the invention, an enable-local/memory-on flag and a physical ID register (which holds the ID of a module) are provided. The enable-local/memory-on flag is settable to a first state and resettable to a second state. When in the first state the flag enables logic within a module for performing functions of the module. When in the second state the flag disables the module. Said comparison means further includes means for resetting said enable-local/memory-on flag, thereby disabling the logic within the module, upon the condition that the node ID (identifying the node at which an error ocurred) in an error-report message is equal to the physical module ID stored in said physical module ID register, thus identifying said node (the node in which the comparison logic is located) as the source of the error.

In accordance with a still further aspect of the invention, the comparison means further includes means for disabling the reporting of errors by said module upon the condition that the node ID (identifying the node at which an error occurred) in an error-report message is equal to the physical module ID stored in said physical module ID register, thus identifying said node (the node in which the comparison logic is located) as the source of the error.

A system constructed in accordance with the teachings of the present invention has the advantage that a redundant shadow module is provided which maintains the state of the primary module and guarantees the state and all access paths thereto to be correct.

BRIEF DESCRIPTION OF THE DRAWINGS

The foregoing and other objects, features, and advantages of the invention will be apparent from the following detailed description of a preferred embodiment of the invention as illustrated in the accompanying drawings wherein:

FIG. 1 is a diagram of a data processing system in which the present invention is embodied;

FIG. 2 is a detailed diagram of the BIUs (100) and (101) shown in FIG. 1;

FIG. 3 is a detailed diagram of the MCUs (102) and (103) shown in FIG. 1;

DETAILED DESCRIPTION

Figure 4:
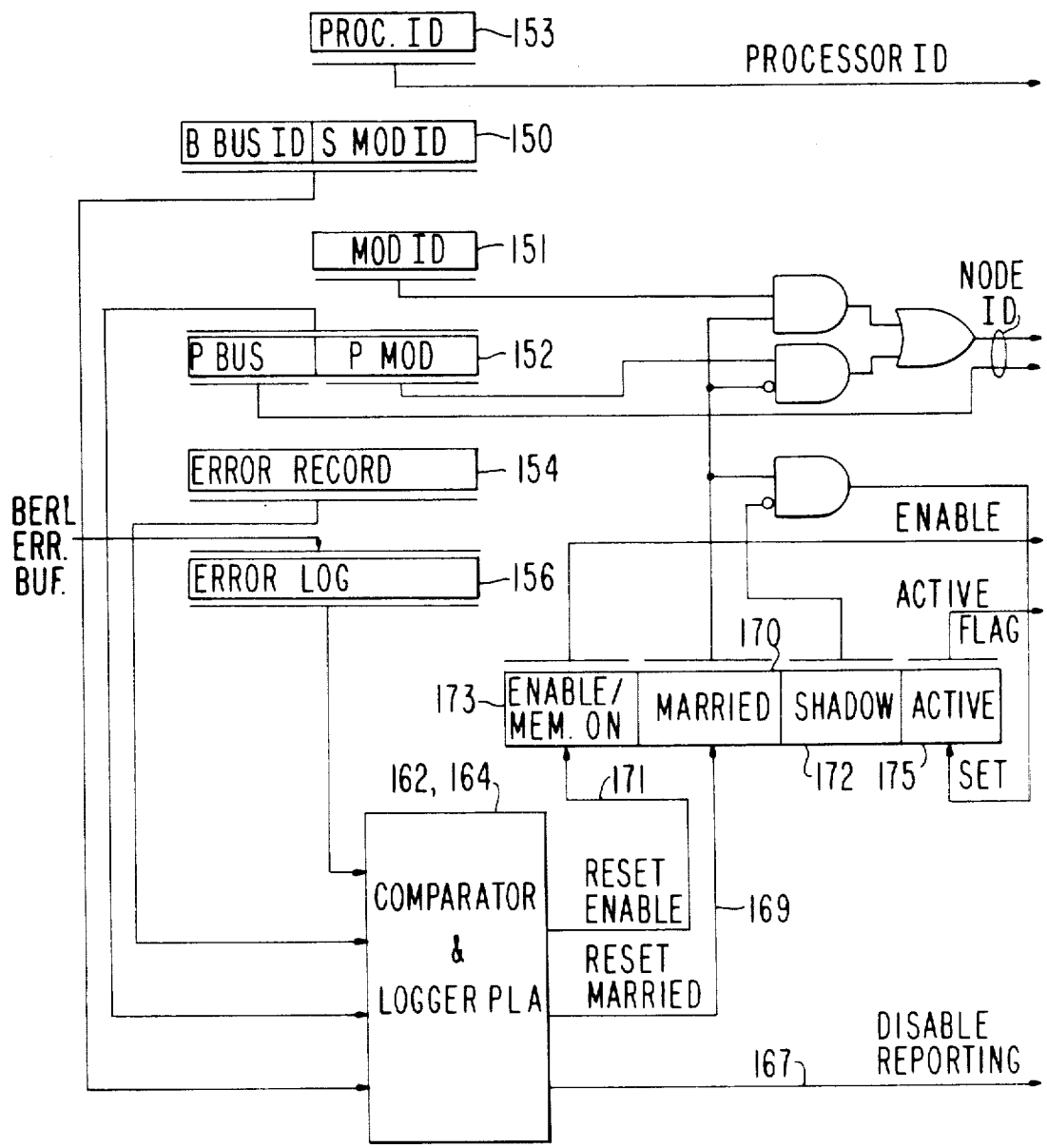
FIG. 4 is a detailed diagram of the primary/shadow logic shown in FIGS. 3 and 4.

FIG. 1 is a diagram of a data processing system employing an interconnect mechanism in which the redundancy mechanism of the present invention is embodied.

The interconnect mechanism provides data processors with connection and access capability to a main memory. The interconnect mechanism is more fully described in the above-referenced application Ser. No. 296,025 of David Budde et al.

There are three module types in the system: GDP (generalized data processor), IP (interface processor with an associated attached processor, AP), and a MCU (memory-control unit). All GDP modules (110, 113) are identical; thus, any GDP module can act as a shadow (backup resource) for any other GDP. Each IP module (111) provides an interface between the central system and one I/O peripheral subsystem (PS). All IP modules have identical interfaces into the central system, but potentially different I/O subsystem interfaces. To act as a backup resource, the IP module must interface to the same AP. Memory modules (112) are only attached to two memory buses, the primary (107) and backup (117) buses via an MCU (102). Backup memory modules must be attached to the same two memory buses.

The interconnect mechanism is comprised of two Very Large-Scale Integrated (VLSI) circuit chips. One chip is a bus-interface unit (BIU-100), and the other chip is a memory-control unit (MCU-102). Thoughout this description the term node is used to refer to either a BIU or an MCU.

The interconnect mechanism is a system of orthogonal lines arranged in a matrix. This matrix is composed of processor buses (ACD) and corresponding control lines, and memory buses (MACD) and corresponding control lines. At the intersection of these lines there is a bus-interface unit (BIU, for example, 100). The bus-interface unit responds to access requests from a processor (110), received over the processor bus, and routes the requests onto the appropriate memory bus for distribution to the correct segment of the address space in a memory module (112). Similarly, reply messages from a memory module are routed onto the memory bus by the Memory Control Unit (MCU-102). In response to a reply message, the appropriate bus-interface unit selects and switches the data onto the processor ACD bus in correct sequence.

Each processor bus supports one Generalized Data Processor (GDP-110) or one I/O Processor/Attached Processor (IP/AP) pair (111). The processor bus makes connection to the interconnect system on the processor side of the bus-interface unit (100). The processor bus is described in detail in the above-referenced Daniel K. Jackson U.S. Pat. No. 4,315,308. The GDP (110) is described in detail in the above-referenced Stephen Colley et al. U.S. Pat. No. 4,325,120. The IP (111) is described in detail in the above-referenced John A. Bayliss et al. U.S. Pat. No. 4,315,310.

GDP, IP, AND MCU MODULE REDUNDANCY

Module shadowing is a technique which provides a complete and current backup module for any logical module. One module in the pair is called the primary, the other the shadow. The primary/shadow module pair operates in lock step. At any instant in time these two modules are aligned to form an active module and a passive redundant module (a complete and current backup module). During operation the active/passive roles are interchanged on alternate MACD bus transactions to provide a ping-pong effect. For any particular request, the active module is responsible for all external signaling, while the redundant module is passive, and simply tracks the operation on the MACD bus and maintains the same state information as the active module. While in the preferred embodiment of the invention every other bus transaction is alternated between active and passive modules, it will be understood by those skilled in the art that one module can be active and the other module passive for any predetermined number of bus transactions.

Refer now to FIG. 2, which is a detailed diagram of the BIUs (100, 102, etc.) shown in FIG. 1. The primary function of a bus-interface unit is to pass memory requests from a processor, (110 or 111) to an attached memory module (112) and to return to the processor any requested data.

The bus-interface unit component (100) is composed of a number of state machines, described in detail in the above identified patent application Ser. No. 336,866 of Budde, et al., the functions of which will now be summarized briefly.

The ACD bus-interface logic (402) receives and decodes requests from the processor. A transaction start is signaled by means of the ISA line from the processor as more fully described in the above-identified Jackson U.S. Pat. No. 4,315,308.

The logic block (602) includes bus, pipeline and reply monitors, an arbiter machine, a grant queue, and a message controller. A time-ordered queue separates processor requests into time-order slots and assures that all requests in a particular time-order slot are serviced before any requests in the next time-order slot. The time-ordered queue also submits a received request to the arbiter machine for MACD bus arbitration. The bus access right issued by the arbiter is queued in the grant queue.

Controlled access to the MACD bus and the issuing of request and reply messages is performed by the pipe monitor, and the message controller. The logic (602) generates the enable bus drivers line to the MACD bus-interface logic (404) to gate data onto the MACD bus when access is granted.

Logic block (600) contains a fault-handling machine, switching logic, and primary/shadow logic. The switching logic includes means for buffering data transmitted between processor and memory. As data comes in for a write request, it is deposited here waiting for memory bus access and issue. As data comes in from a read acknowledgment, it is also deposited here, waiting for return to the processor. The fault-handling logic receives error messages, logs them, and propagates error messages to other nodes. The following registers in the shadow/primary logic, shown in detail in FIG. 4, are used to permit shadowing and to recover from errors in either the primary or the redundant module. Except as stated otherwise, the registers are the same whether the module is a GDP module, an IP module, or a MCU module.

Interconnect Device ID Register (152)

Physical Node ID or Address is the module ID concatenated with the Bus ID, from register (152).

Bus ID—These bits define the MACD bus to which the particular BIU is attached. On an MCU these bits define the MACD bus which is the MCU's primary bus. The bus ID is read-only, except the second bit, which is also writable in the MCU and is synonymous with the bus select pin. In the BIU, the second bit is not writable. The backup bus (register 150) for a BIU will have the same bus ID except the second bit is complemented.

Module ID—These bits are loaded into register (152) at INIT time through the SLAD bus on the MCU and from the lower 6 bits of the processor ID loaded on the ACD bus on the BIU. They define a unique module position across all of the buses. The module ID register is a read-only register. MCUs use the module ID for deciding participation in local accesses. BIUs use both the module ID and bus ID for deciding participation in local accesses. The exception to this is for a BIU module pair which is primary/shadow married. In this case the local participation address is the logical ID and the bus ID.

Log Register (156)

Reported Module ID (L Mod)—This is the module ID of the currently logged error-reporting source.

Reported Bus ID (L Bus)—This is the bus ID of the currently logged error-reporting source.

Record Register (154)

Reported Module ID (R Mod)—This is the module ID (transferred from the log register-156) of the previously logged error-reporting source.

Reported Bus ID (R Bus)—This is the bus ID (transferred from the log register-156) of the previously logged error-reporting source.

Logical ID Register (151)

Logical ID—This ID is set during INIT to be equal to the module ID. However, the bits are arranged in descending order instead of ascending order as in the module ID (i.e., the least significant bit becomes the most significant bit, etc.). The logical ID is used for MACD bus arbitration in both the MCU and BIU. In addition the BIU uses the logical ID in place of the module ID for local accesses when its married (170) bit is set in its state register.

When the BIU is married (married bit 170 is set) to a shadow, or visa versa, the two modules will use the logical ID. Clear PU is a BIU specific local command which is used to put the primary and shadow BIUs into lock-step operation. When this command is used, the BIU's logical ID register must be setup and the married bit in the state register must be set in both primary and shadow BIUs. This is done because the local command clear PU is used to set the primary and the shadow into lock-sync and needs to be done to the primary and the shadow simultaneously. This command causes the BIU to assert the CLRPUOUT signal. This signal is connected to the processor's CLEAR pin, and forces the processor to a known state. This synchronizes the primary and shadow processor modules.

Spouse ID Register

Spouse ID—The spouse ID (150) is set in each node to equal the module ID of the other node in the primary/shadow pair. It is set at INIT time to a known value and should be setup before setting the married bit in the state register to unify the primary and shadow modules. It is used in the comparator/logger PLA (162, 164) to compare an error report with the spouse ID to recognize that an error report was made by the spouse. For example, assume that the married bit is set. Assume also that an error report logged in register (156) specifies a permanent module error on a module with a module ID that matches the module ID in the spouse register (150). When these two assumed conditions exist, the comparator and logger PLA logic (162, 164) will generate the reset married signal which will reset the married bit (170). This causes this node to handle all subsequent requests instead of alternating with its partner.

State Register (170, 172)

Married—The married bit (170) is used to unify a primary and shadow pair. When this bit is set, BIU's will use the logical ID instead of the module ID for recognizing local accesses. In certain types of error recovery the comparator/logger PLA (162, 164) will reset the married and the shadow bit when the spouse becomes involved in a fault condition.

Shadow—The shadow bit (172) specifies (when its married bit is set) when set that the module will become the primary, and when reset that the module will become the shadow. The shadow bit is used to determine which module of the pair will handle the first request. In certain types of error recovery the hardware will reset the married bit and the shadow bit when the spouse becomes involved in a fault condition.

Active—The active bit (175) specifies when set that this module will handle the next bus transaction. It is set initially in the primary node in which the married bit is set and the shadow bit is reset. It is reset initially in the shadow node in which the married bit and the shadow bit are set. This ensures that the primary module will handle the first bus transaction. The active bit is changed to its opposite state after each bus transaction.

Processor ID (153-BIU only)

This is the processor ID which is used in claiming IPCs on the MACD bus and is used by the processor as its processor unit number, for locating its processor object as described in section 4.8.1 of the above-identified Colley, et al. U.S. Pat. No. 4,325,120. This field is loaded off of the ACD bus at INIT time. A processor ID of O is used for indicating global IPC.

IPC Register (BIU only)

Writing to this register (via P-local access) causes an IPC message to be sent on the MACD bus to a destination BIU whose processor ID matches the broadcasted ID in the IPC message. Note that a processor ID of O denotes a global IPC and all BIUs are the destination. Thus a BIU cannot be assigned a processor ID having the value O; otherwise a local IPC could not be sent to that BIU. (For a description of local and global IPC see section 5.2.5 of the above-identified Colley, et al. U.S. Pat. No. 4,325,120).

Refer now to FIG. 4 which is a detailed diagram of the primary/shadow logic (600) shown in FIGS. 2 and 3. This logic, together with state diagrams, is described more fully in the above-identified patent application Ser. No. 393,906 of Budde, et al. The register (150) holds the backup bus ID and the spouse module ID information for the bus and module with which this node is paired. The register (152) holds the physical bus ID and the physical module ID information for this node. The log register (156) holds the error-log information for the current error report loaded from the BERL error buffer in the BERL receiver (130) of FIG. 2 of the above-identified patent application Ser. No. 393,906 Budde, et al. The record register (154) holds the error-log information for the previous error report loaded from the log register (156). The comparator and logger PLA (162, 164) utilize the contents of the registers (150-156) to decode various permanent error conditions for this node or for the node which this node is backing up. A count field (not shown) maintains a count of the number of errors which have occurred. A perm/trans bit (not shown) indicates if the error is a permanent or a transient error and is set by the logger PLA. The married bit (170) is used to unify a primary and shadow pair. The shadow bit (172) specifies that this module is either a primary or a shadow when the married bit is set. It determines if the active bit (175) will be set. The active bit being set causes this module of the pair to handle the first access. The active bits in the primary and shadow modules are set to opposite states. The modules handle alternate accesses (ping-ponging) by changing the state of the active bit on every bus transaction, so long as the married bit is set. When the married bit is reset, ping-ponging ceases, and a module remains active on every access.

As described with respect to FIG. 3 of the above-identified patent application Ser. No. 393,906 of Budde, et al., the logger PLA generates a Load log register signal which gates the error report from the BERL error buffer into the log register (156). The logger PLA generates the reset married signal which resets the married bit to activate a shadow module and make it a primary module. The logger PLA generates the perm/trans signal which sets the perm/trans bit to permanent upon the occurrence of a permanent error.

Figure 5:
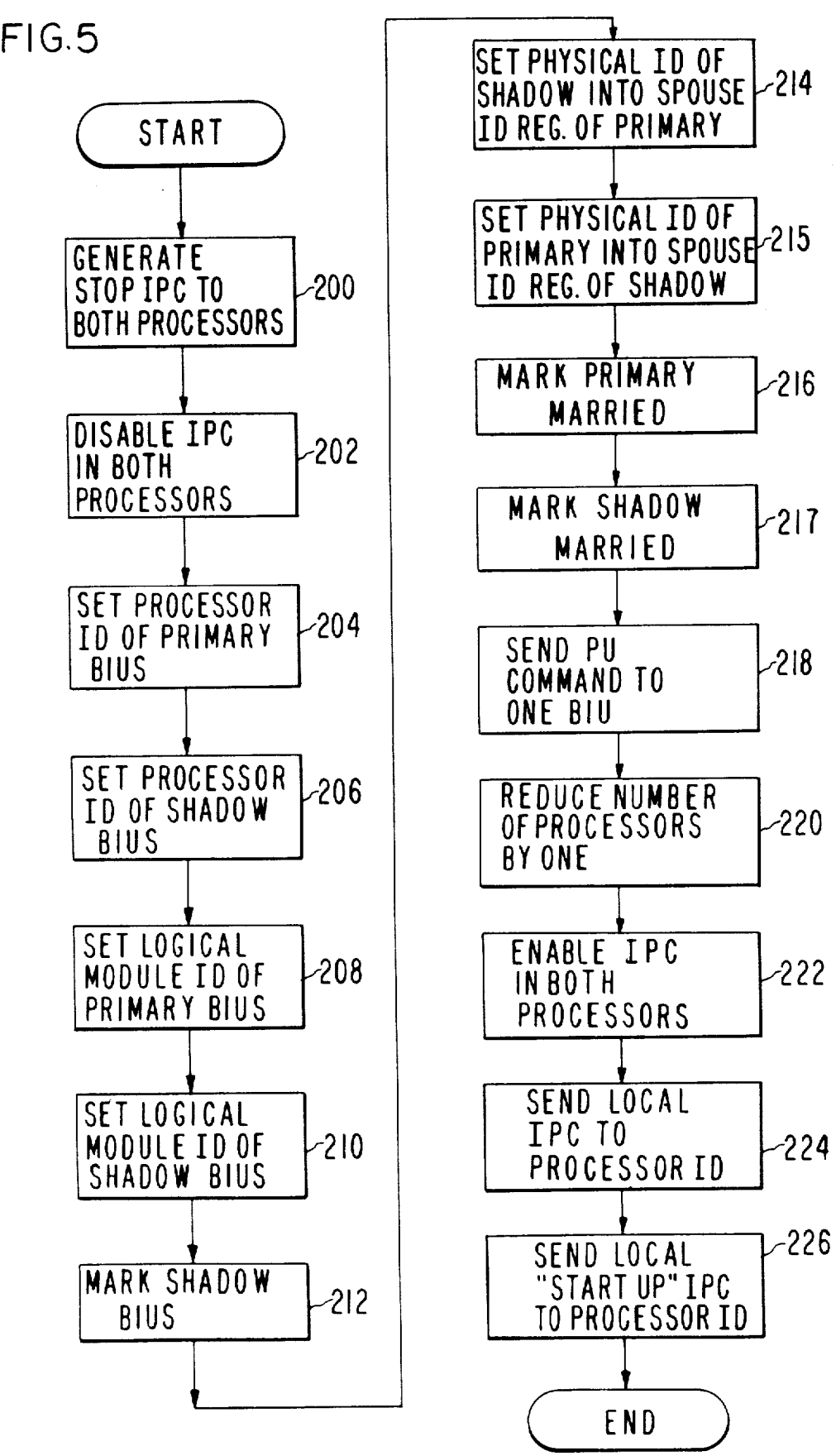
FIG. 5 is a flow diagram of the procedure for activating a primary/shadow pair of processors; and, FIG. 6 is a flow diagram of the procedure for deactivating a primary/shadow pair of processors.
Figure 6:
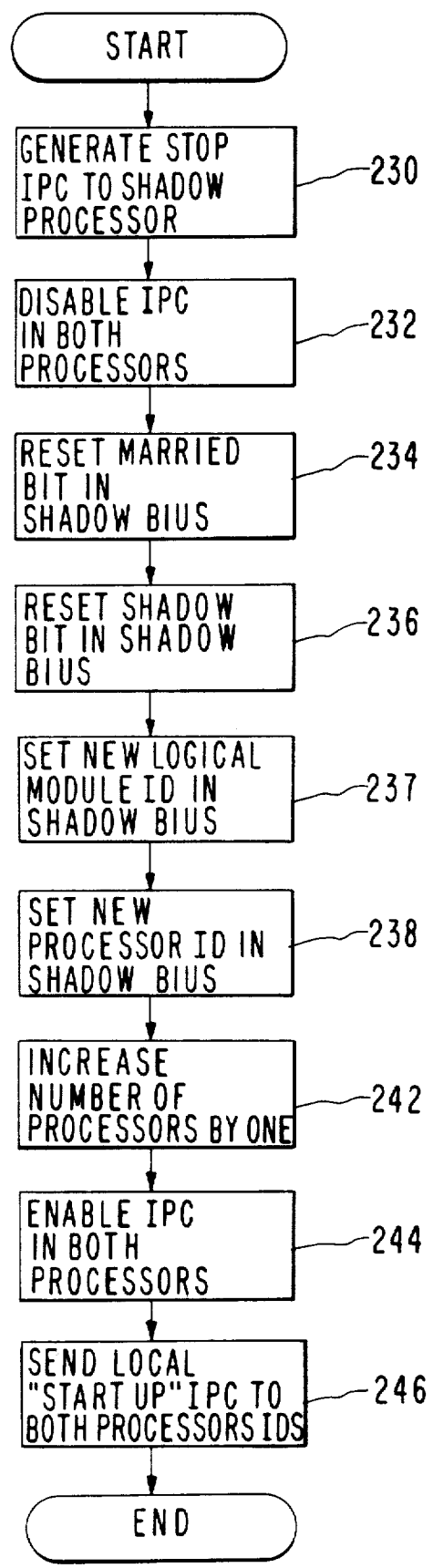

Refer now to FIG. 5 which is a flow diagram of the procedure for activating a primary/shadow pair of processors, and FIG. 6, which is a flow diagram of the procedure for deactivating a primary/shadow pair of processors.

There are four basic mechanisms required to support shadowing:

1. Startup and synchronization of a module pair.
2. Lock-step operation
3. Error detection
4. Deactivating shadow operation These mechanisms are implemented only in the BIU and MCU. The GDP and IP are unaware of shadowing operation. (Interface logic between an IP and the AP is, however, aware of shadow operation.) Although logically shadowing concepts carried out in accordance with the principles of the present invention are the same independent of module type, the mechanisms are explained below for each module type.

GDP MODULE REDUNDANCY

1. Startup and Synchronization of a GDP Module Pair

Any two GDP modules may be paired together (married) to form a shadowed module. This is possible because all GDP modules have identical interfaces. Startup is performed by a processor other than the two which are about to be married. This startup procedure is the same whether done at initialization (INIT time) or done on line during normal system operation. The basic function of the startup sequence is:

Have the primary/shadow processors use the same processor object in memory so every reference is identical (processor objects are described in section 4.8.1 of the above-referenced Colley, et al. U.S. Pat. No. 4,325,120);

Synchronize and coordinate the primary/shadow processors at the microinstruction level to guarantee that memory references occur on the same clock cycle; and, Make each of the two physical processor modules aware of their partner, so that in the event of a failure, the correct recovery operations will take place. (Only the BIUs, not the GDPs and IPs, are aware of the partner.)

Referring now to FIG. 5, the steps in the startup sequence are as follows:

1. The two processors involved in the marriage are stopped in a stable state. If both processors are running presently, then this can be accomplished by sending the local interprocessor communication (IPC) stop to both processors (block 200). (IPC is described in section 5.2.5 of the above-referenced Colley, et al. U.S. Pat. No. 4,325,120.) If a module has failed or is in an unknown state, then a different procedure must be used. First the IPC register in the BIUs must be cleared. Then a clear PU command, described above, is issued to each processor module. These two steps put the processors in a known and stable state.

2. IPCs to the two processors are disabled either by locking up both global and local IPCs segments (described in the above-referenced Colley, et al. U.S. Pat. No. 4,325,120) in the processor object or by software convention, such as assuring that nothing will generate an IPC (block 202).

3. The processor module ID in the primary-elect BIUs is changed to the selected value for the primary/shadow pair. This is done by writing to the processor ID register 152 in all of the BIUs attached to this processor (block 204).

4. The processor module ID in register 150 of the shadow-elect BIUs is changed to the selected value for the primary/shadow pair (block 206). (Note: Now these two modules will have and use the same processor ID. This will give both modules access to the same processor object and allow them to respond in unison to IPCs, because IPCs are addressed using the processor ID as an address.)

5. The logical module ID of the primary-elect BIUs is set to the selected value for the primary/shadow pair (block 208). This is done by writing to the logical ID register xxx in all of the BIUs attached to this processor.

6. The logical module ID in the shadow-elect BIUs is set to the selected value for the primary/shadow pair (block 210). Now these two modules will be using the same node ID (the logical module ID) when they arbitrate for the bus. This will allow the two modules to track each other's operation over the memory bus. This is explained as follows: All logical IDs for nodes of the interconnect system must be unique. Normally the logical ID will also be unique from all physical module IDs but this is not required. The logical ID may be the same as either one of the physical IDs of the two modules being married.

If the logical ID is the same as one of the physical IDs, then that module must be the first one of the pair to have its married bit set (step 10 below).

7. The BIUs in the shadow-elect module are marked as shadows by setting the shadow bit (172) in the State register in all the BIUs in this module (block 212). This operation is accomplished by reading the state register, setting the shadow bit in the memory image of the state register, then writing back the new value into the state register.

8. The physical module ID (from the interconnect device ID register 152) of the shadow-elect module is loaded into the spouse ID register (150) of all the BIUs in the primary-elect module (block 214).

9. The physical module ID (from the interconnect device ID register 152) of the primary-elect module is loaded into the spouse ID register (150) of all the BIUs in the shadow-elect module (block 215).

10. The BIUs in the primary-elect module are marked as married by setting the married bit (170) in the state register in all the BIUs in this module (block 216). This operation is accomplished by reading the state register, setting the married bit in this memory image of the state register, then writing back the new value into the state register. (Note: This module will now act like the primary module in a married pair. It will use the logical ID to recognize local register accesses, and it will be the active module until after the first bus request by this module. Thereafter it will alternate the handling of bus requests with the shadow module.)

11. The BIUs in the shadow-elect module are marked as married by setting the married bit in the state register in all the BIUs in this module (block 217). (Note: This module will now act like the shadow module in a married pair. It will use the logical ID to recognize local register accesses, and it will remain passive until after the first bus request by the primary. Thereafter it will alternate the handling of bus requests with the primary module.)

The two modules are now locked together and operating as a primary/shadow pair. These two physical modules have been blended into a single logical unit. There is no independent access to the physical modules.

12. A clear PU command, described above, (a local register write operation, with any value in the data field) is sent to the married pair (block 218). This command is only sent to one BIU, not every BIU in the module (one BIU in the primary and one BIU in the shadow.) It may be addressed to any one of the BIUs in the module. This command causes the BIU to assert the CLRPUOUT signal. This signal is connected to the processor's CLEAR pin, and forces the processor to a known state. This synchronizes the primary and shadow processor modules. (Note: BIUs are synchronized by letting them both reach the idle state. However, the processors are in a two-instruction microcode loop when idle. Thus, they must be explicitly synchronized.) The number of processors in the system (used for broadcast IPC) is reduced by one (block 220), and IPCs are enabled (block 222).

13. A local IPC is sent to this processor ID (block 224). This resets the processor pair.

14. A local startup IPC is sent to this processor ID (block 226). This causes the processor pair to read in their processor ID from the BIUs and then requalify all processor information. (Note: This requalification is done by a single logical processor, not two independent processors.) The logical processor will then respond to whatever command was placed in the local communication segment (stop, dispatch, etc.) of the processor object reached by using the processor ID.

2. Lock-Step Operation

During normal operation the two modules operate in lock step as a single logical module. This provides a complete and current backup for the module. This will allow recovery from any single failure in either module without any interruption to the logical software environment. At any instant of time, one module in the pair will be the active module, while the other one is passive. Initially, for the first memory request, the primary module is the active module, and the shadow module is the passive module. The active module is responsible for driving the memory bus when this module issues a request or reply. The passive module monitors the MACD bus and arbitration lines to track the operation of the active module. (Bus arbitration is described in the above-referenced patent application Ser. No. 342,837 of Budde, et al.) By tracking the active module, the passive module is able to maintain exactly the same state information as the active module. Data always enters both modules, but data only leaves via the active module.

The roles of active and passive module are reversed after each bus transmission from this module. Thus, the roles of active/passive module are switched after each memory request, or reponse, or bus blurb. A bus transaction consists of arbitration, bus transmission, and error reporting, as described in the above-referenced patent application Ser. No. 296,025 of Budde, et al. This ping-pong action exercises all of the logic in both the primary and shadow modules. Any latent failure which exists in either module will be detected immediately. All of the logic to perform this lock-step operation is contained in the BIU. Neither the processors nor the external TTL is aware that a module is participating as one-half of a primary/shadow pair. Each physical module (primary and shadow) remains a self-checking module. Whether active or passive, all detection mechanisms remain enabled and are continuously checking the operation of the module. The passive module is, however, only checking itself. It is not performing any type of double check on the operation of the active module.

Error Recovery and Deactivating Shadow Operation in Processor Modules

Deactivation allows a primary/shadow pair of modules to be stopped and logically split apart. Under error conditions, this operation is carried out by the hardware recovery mechanisms, described in the above-referenced patent application Ser. No. 393,906 of Budde, et al. If the comparator and logger PLA (162, 164) in FIG. 4 determines that the module ID in the error report stored in register (156) matches the spouse ID in this node, stored in register (150), and the married bit (170) is on, then this module is the redundant resource and should be activated to take over operation for the other module of the pair. The comparator and logger PLA (162, 164) will assert the reset married line (169), to clear the married bit (170) in this node. This is the only action that need be taken. Clearing the married bit will cause the module to be active on every access instead of alternating with its partner. In this manner, the active module will mask the failure of its spouse.

To deactivate a shadow pair during normal error-free operation, the following steps, shown in FIG. 6, are taken:

1. The processor is stopped in a stable state by the stop local IPC (block 230).
2. IPCs to the processor are disabled either by locking up both global and local IPCs or by software convention (block 232).
3. The married bit (state register bit 170) in the BIUs is reset (block 234). Note that this bit will be reset simultaneously in both the primary and shadow modules. After this bit is reset, both modules will become active, each capable of responding to requests on its own. The local registers in the two modules may now be addressed individually using the physical module ID. However, the two modules are still using the same logical ID for arbitration.
4. Reset the shadow bit (state register bit 172) in the BIUs in the exshadow module (block 236).
5. Assign the BIUs in the exshadow module a new logical module ID for use in arbitration (block 237). (Note: The primary could also have its logical ID changed.)
6. Assign a new processor ID in the exshadow module BIUs (block 238). (Note: The primary could also have its processor ID changed.)
7. The number of processors in the system (used for global IPC) is increased by one to account for the freed processor of the pair (block 242), and IPCs in both processors are enabled (block 244).
8. A local startup IPC is sent to both processor IDs (block 246). The start up IPC causes the processor ID to be read in from the BIUs, and then all processor information is requalified.

IP MODULE REDUNDANCY

On the central system side, IP shadowing is done identically to GDP module shadowing. On the PS side, the external support logic provides the functionality to achieve shadowing on the PS interface. Even if the PS interface does not offer total redundancy into the I/O system, IP module shadowing is important. IPs, like GDPs, perform complex operations over system objects in the central system. Module shadowing guarantees that no object will be left in an inconsistent state because of a failure in the IP module. Without module shadowing, it is possible for an IP failure to cause a system crash because an object was left in an inconsistent state.

Startup and Deactivation

The external logic can use signals from the AP plus the CLEAR PU signal frm the BIUs to trigger functions for startup and deactivation. The IP is unaware of primary/shadow or active/passive designation, and thus cannot be used to help control the external logic. The external logic could be as simple as connecting the primary and shadow IPs to a single bus which attaches to a single AP, or as complex as extending shadowing on into the AP subsystem itself. Startup and deactivation requires a coordinated effort between software in the peripheral subsystem and software in the central system.

Lock Step Operation

The IPs must be kept in lock step for the correct operation of the mechanisms on the BIUs. This implies that the two IPs can not have independent asynchronous interfaces to the PS. This is not allowed because the two IPs could react to the asynchronous signals over different time intervals, thus losing lock step operation. To achieve lock step operation, the synchronization must be done in a cooperative manner that guarantees that both the primary and the shadow module will respond in identical manner to the signals from the PS.

MEMORY MODULE REDUNDANCY

Refer now to FIG. 3, which is a detailed diagram of the MCUs (102 and 103) shown in FIG. 1. The registers described previously with reference to FIG. 4, are used to permit shadowing and to recover from errors in either the primary or the redundant module. Except as stated otherwise, the registers in FIG. 4 are the same for the MCU module as they are for the GDP and IP modules.

The memory-control unit (MCU) is comprised of a memory bus-interface portion (518, 650, 654) and a storage bus-interface portion (511, 652), described in detail in the above-referenced patent application Ser. No. 336,866 of Budde, et al., the functions of which will now be summarized briefly.

The memory bus interface includes a bus monitor, and a pipeline monitor, which drive a message controller. A grant decoder and grant queue connected to the message controller keep track of time slots that have been granted to the bus-interface units in the particular row of the switching matrix to which the MCU is connected. A reply monitor, connected to a message and reply FIFO (654), is provided to control the insertion of a reply message into an empty time slot. The message protocol on the MACD bus is described in the above-referenced patent application Ser. No. 342,837 of Budde, et al.

The storage-bus interface includes a request FIFO and a reply FIFO (654) which are connected to the MACD bus-interface logic (511) and to an internal bus. Attached to the internal bus is a fault-handling machine (650) which handles error conditions as is fully described in the above-referenced Budde, et al. patent application Ser. No. 296,025. Address-control logic and data-control logic drive a SLAD bus interface (518) which connects to the memory module.

The MCU attaches to the memory bus (MACD), which provides the main communication path of the interconnect system. The MCU receives variable-length access requests at it memory bus interface from a bus-interface unit (BIU) on the MACD bus and makes the proper series of accesses to memory through its storage bus (SLAD) interface. After completion of the accesses to memory, the MCU returns the proper reply via an empty time slot on the MACD bus.

Establishing a backup module for a memory module is done in a manner very similar to way the processor modules are married. The following describes the steps taken during startup, lock-step operation, and deactivation of a primary/shadow pair of memory modules.

Startup Sequence

1. All accesses to the two memory modules involved in the marriage are stopped. There are two basic ways of reaching this quiescent state. The system could be stopped while the two modules are linked together, or the system software could use its memory management routines to make this portion of memory unaccessible. There are two problems with the second approach. First, there are objects stored in memory which must always be accessible (known as frozen memory). Second, memory interleaving will mean that a very large block of memory would have to be deallocated (one or two megabytes). These two problems make stopping the system the preferred approach.

2. The two memory arrays must be made to hold identical contents. This can be done in two ways. If the memories do not hold any data, then both arrays can be cleared using the CLEAR MEMORY command. The second approach is to copy the data from one array into the second array.

3. The MCUs in the shadow-elect module are marked as shadows by setting the shadow bit (172, FIG. 4) in the state register in the MCU. This operation is accomplished by reading the state register, setting the shadow bit in this memory image of the state register, then writing back the new value into the state register.

4. The memory address range for the primary-elect module is set to the selected value for the primary/shadow pair by writing to the MEMORY START AND END register.

5. The memory address range for the shadow-elect module is set to the selected value for the primary/shadow pair by writing to the MEMORY START AND END register.

6. The MCUs in the primary-elect module are marked as married by setting the married bit (170, FIG. 4) in the state register. This operation is accomplished by reading the state register, setting the married bit in this memory image of the state register, then writing back the new value into the state register. (Note: This module will now act like the primary module in a married pair. It will be the active module until after the first memory reply by this module.)

7. The MCUs in the shadow-elect module are marked as married by setting the married bit (170, FIG. 4) in the state register. (Note: This module will now act like the shadow module in a married pair. It will remain passive until after the first memory reply by the primary.)

The two modules are now locked together and operating as a primary/shadow pair. These two physical modules operate as a shadow pair only for memory array accesses. They retain distinct local register address ranges, and may be accessed independently.

Unlike the processor modules, the primary and shadow memory modules do not operate in cycle-by-cycle lock step. Instead the modules are synchronized at the level of messages on the memory bus. Both modules recognize bus requests which are addressed to them, and carry out the required action on the memory array. The active module (the one whose active bit, 175, is set) is responsible for generating the reply message. (Remember, each MCU will always reply to local register accesses and commands independent of its active/passive status.) The active/passive roles are switched after each reply to a memory access request, by each MCU setting its active bit to the opposite state.

The lock step constraint is loosened for memory modules so that the two arrays may be managed independently. This is needed to handle situations which may not occur simultaneously in both modules (ex: ECC data correction or refresh). This loosening of the lock step operation is possible because memory modules never generate MACD bus request messages, only replies. Cycle-by-cycle lock step operation is required to track the operation of the arbitration network for request messages in BIUs because the arbitration lines carry only a partial decoding of the arbitration ID. The arbitration for replies in MCUs is fully decoded (the address in the request message combined with FIFO ordering of replies) and thus does not require cycle-by-cycle lock step operation.

Because the two modules are not operating in lock step, it is possible for the passive module to fall behind the active module. Because the active/passive role is reversed after every reply, a module can never be more than one access behind the operation of its partner. (The reply to the second access is made by the slow module, thus the system waits until it has caught up before continuing.) To accommodate this variance, the MCUs input buffer can hold four requests even though the bus pipeline is limited to three outstanding requests. If the passive module is behind (the active module has sent its reply message, but the passive module has not completed its array access) when an error is reported, it will complete the final access required to catch up to the active module before stopping. The passive module is responsible for monitoring the bus and tracking the state of the active module. The passive module will always remain in step with the active module at a memory bus level. The passive module takes special steps to guarantee that the RMW lock and the array contents are always consistent with the state of the active module. This ensures that the two arrays always have identical information content.

Each physical module (primary and shadow) remains a self-checking module. Whether active or passive, all detection mechanisms remain enabled and are continuously checking the operation of the module. The passive module is checking itself. It is not performing any type of double check on the operation of the active module. Any latent failure in either module will be detected immediately by that module.

Memory module shadowing is deactivated in the following way:

1. All accesses to the memory modules are stopped by the system software.

2. The married bit (170) in each MCU is reset. Note that this bit must be reset separately for both the primary and shadow modules. After this bit is reset, both modules will become active.

3. Reset the shadow bit (172) in the MCUs in the ex-shadow module.

4. The two modules can now be assigned independent address ranges and begin operation as independent units.

Error Recovery of Disabling GDP, IP, or Memory Modules

As described above with respect to processor modules, deactivation allows a primary/shadow pair of modules to be stopped and logically split apart. Under error conditions, a module may be disabled if it is faulty. This operation is carried out by the hardware recovery mechanisms, described in the above-referenced patent application Ser. No. 393,906 of Budde, et al.

If the comparator and logger PLA (162, 164) in FIG. 4 determines that the module ID in the error report stored in register (156) matches the spouse ID in this node, stored in register (150), and the married bit (170) is on, then this module is the redundant resource and should be activated to take over operation for the other module of the pair. The comparator and logger PLA (162, 164) will assert the reset married line (169), to clear the married bit (170) in this node. This is the only action that need be taken at this node. Clearing the married bit will cause the module to be active on every access instead of alternating with its partner. In this manner, the active module will mask the failure of its spouse.

If the comparator and logger PLA (162, 164) in FIG. 4 determines that the module ID in the error report stored in register (156) matches the physical ID in this node, stored in register (152), and the married bit (170) is on, then this module is the faulty resource and should be disabled. The comparator and logger PLA (162, 164) will assert the reset married line (169), to clear the married bit (170), and will assert the reset enable line (171), to clear the enable/memory on bit (173) in this node.

Assertion of the reset enable line (171) and the disable reporting line (167) has the following effect, depending upon the module type:

GDP or IP Module. A processor module is disabled when all of its BIUs:

Disable primary and backup memory address ranges. This is done using the four bus state bits (A, B, C, D, defined in the above-identified Budde, et al. application Ser. No. 393,906 in the state register. These bits are all reset to zero.

Disable local register accesses. This is done by clearing the enable local bit (173) in the state register. Ignore the MERL line. The MERL receiver is disabled in each BIU by the assertion of the disable reporting line (167). In this state the processor module is totally deactivated. No requests of any type may be generated by this module. The BIUs will still reply to local register and IPC requests which are issued from other processors. The error detection circuits at the MACD interface remain enabled and if an error is detected it will be reported. All errors will have the MODULE/BUS error type (error types are described in the section entitled Error-Report Message, in the above-referenced patent application Ser. No. 296,025 of Budde, et al.).

Memory module. A memory module is disabled when the MCU: Disables its memory address range. This is done by clearing the memory-on bit (173) in the state register. The MCU will still respond to local register requests. All of the error detection circuits, except buffer check, remain enabled. All errors will have the BUS/MODULE error type. The MCU will remain attached to the same MACD bus.

The above-described recovery operation takes place without any intervention by software or logic external to the logic in the BIU or MCU node itself.

SUMMARY

A system has been described comprised of a number of intelligent nodes (100, 101, 102, etc.) in a matrix composed of processor buses (ACD buses) with corresponding error-reporting (MERLs) and control lines; and memory buses (MACD) with corresponding error-reporting (BERLs) and control lines. Each node has means (156) for logging errors and means for reporting errors on said error-report lines. A primary module (110) is connected to a primary node (100) which controls access to the common memory bus (107). A shadow module (113) is connected to a shadow node (101) which controls access to the common memory bus.

Each of said primary and shadow nodes include means (married bit-170, shadow bit-172, and active bit-175) operative for marrying the primary module and said shadow module in a primary/shadow pair such that each module in the primary/shadow pair tracks the operations directed to said primary/shadow pair, and such that each module in said primary/shadow pair alternates with the other module in the handling of requests or replies. When the married bit is reset, it causes a module to be active on every access, and that module in the primary/shadow pair ceases to alternate with the other module in the handling of requests or replies.

Each node includes means (spouse ID register-150) for registering the ID of the other node of said primary/shadow pair. Comparison means (162, 164) in the node resets the married bit upon the condition that the node ID (identifying the node at which an error occurred) in an error-report message is equal to the ID stored in the spouse ID register, thus identifying the spouse node (the partner of the node in which the comparison logic is located) as the source of the error. In this manner the error-free module takes over and ceases to alternate with its partner.

An enable-local/memory-on flag (173) and a physical ID register (151) are provided. When in a first state the enable-local/memory-on flag enables logic within a module for performing functions of the module. When in a second state the flag disables the module. The comparison means further includes means for resetting the enable-local/memory-on flag, thereby disabling the logic within the module. The logic is disabled upon the condition that the node ID (identifying the node at which an error occurred) in an error-report message is equal to the physical module ID stored in the physical module ID register. This identifies the node (the node in which the comparison logic is located) as the source of the error.

The comparison means further includes means for disabling the reporting of errors by the module upon the condition that the node ID (identifying the node at which an error ocurred) in an error-report message is equal to the physical module ID stored in the physical module ID register, thus identifying the node (the node in which the comparison logic is located) as the source of the error.

While the invention has been particularly shown and described with reference to preferred embodiments thereof, it will be understood by those skilled in the art that the foregoing and other changes in form and detail may be made therein without departing from the spirit and scope of the invention.

What is claimed is:

1. For use in a data processing system in which a number of intelligent nodes are provided in a matrix composed of processor buses with corresponding error-reporting and control lines, and memory buses with corresponding error-reporting and control lines, wherein each node has means for logging errors and reporting errors on said error-report lines, wherein a primary module is connected to a primary node which controls access to a common memory bus, and wherein a shadow module is connected to a shadow node which controls access to said common memory bus, the combination in each of said primary and shadow nodes comprising:

shadow bit means settable to a first state and to a second state;

first logic means connected to said processor bus lines for receiving data destined for said common memory bus, said first logic means including means for seting said shadow bit means and said married bit means;

married bit means operative when set to a first state for marrying said primary module and said shadow module in a primary/shadow pair such that each module in said primary/shadow pair is activated to receive data directed to said primary/shadow pair; and, second logic means responsive to said shadow bit means and to said married bit means for causing said primary module to be active for at least the first bus transaction and passive for other predetermined bus transactions upon the condition that said shadow bit means is set to said first state and said married bit is set to said first state, said logic means including means for causing said primary module to be passive for the first bus transaction and active for other predetermined bus transactions upon the condition that said shadow bit means is set to said second state and said married bit is set to said second state, such that each module in said primary/shadow pair alternates with the other module in the handling of a predetermined number of memory bus transactions.

2. The combination in accordance with claim 1 wherein said means responsive to said shadow bit and to said married bit further comprises:

means for causing said module to be active on every access upon the condition that said shadow bit is set and said married bit is reset, whereby said module ceases to alternate with the other module in the handling of memory bus transactions.

3. The combination in accordance with claim 1 further comprising:

spouse ID register means for registering the spouse ID of the other node of said primary/shadow pair:

means for recieiving an eror report message including means for registering a node ID in an error report message, said node ID identifying the node at which an error ocurred; and, comparison means in said node for resetting said married bit means upon the condition that the node ID (identifying the node at which an error ocurred) in an error-report message is equal to the spouse ID stored in said spouse ID register, thus identifying the spouse node (the partner of said node in which the comparison logic is located) as the source of the error;

whereby the error-free module takes over and ceases to alternate with its partner.

4. The combination in accordance with claim 1, further comprising:

an enable-local/memory-on flag settable to a first state and resettable to a second state;

logic means within said module for performing functions of said module;

means operative upon the condition that said enable-local/memory-on flag is in said first state for enabling said logic means; and, wherein said comparison means further includes means for resetting said enable-local/memory-on flag upon the condition that the node ID (identifying the node at which an error ocurred) in an error-report message is equal to the physical module ID stored in said physical module ID register, thus identifying said node (the node in which the comparison logic is located) as the source of the error, thereby disabling said logic means within said module.

5. The combination in accordance with claim 4 wherein said comparison means further includes means for disabling the reporting of errors by said module upon the condition that the node ID (identifying the node at which an error occurred) in an error-report message is equal to the physical module ID stored in said physical module ID register, thus identifying said node (the node in which the comparison logic is located) as the source of the error.

6. In a data processing system including, a number of bus-interface unit (BIU) nodes and memory-control unit (MCU) nodes and in which a switching matrix provides electrical interconnections between horizontal memory buses and vertical ACD buses connected in said matrix by means of said BIU nodes located at the intersections of said memory and ACD buses, said memory-control unit (MCU) nodes connected to said memory buses, means for detecting an error, occuring in a particular node;

an error-reporting matrix including horizontal Bus Error Report Lines (BERLs) and vertical Module Error Report Lines (MERLs), said BERLs being associated with said memory buses such that all BIU and MCU nodes sharing an memory bus are connected with a pair of BERLs, said MERLs being associated with said ACD buses such that all nodes sharing an ACD bus are connected with a MERL, and, error-reporting means in said particular node connected to said means for detecting an error, said error-reporting means including means for receiving error messages transmitted over at least said one BERL, and means reporting error messages over at least said one BERL, said error messages identifying the type of error and the location (ID) at which the error was detected, a recovery mechanism in said particular node comprising:

permanent error determining means operative upon the condition that an error recurs, for causing said error-reporting means in said particular node to propagate a premanent-error error-report message, said error message identifying the type of error and the location (ID) at which the permanent error was detected;

error-report logging means in said particuar node connected to at least one of said error-report lines, for logging received error-report messages propagated to said particular node;

first registering means in said node for registering the ID of a resource with which said node is paired to provide a redundant resource;

means connected to said first registering means for comparing said location ID in said received error-report message with said registered ID of said resource; and, means responsive to said comparison means for activating said node upon the condition that said received error-report message identifies, as a faulty resource, said resource with which said node is paired, to thereby cause said node to become active and take over operation for said faulty resource.

7. In a data processing system including, a number of bus-interface unit (BIU) nodes and memory-control unit (MCU) nodes and in which a switching matrix provides electrical interconnections between horizontal memory buses and vertical ACD buses connected in said matrix by means of said BIU nodes located at the intersections of said memory and ACD buses, said memory-control unit (MCU) nodes being connected to said memory buses, means for detecting an error, in a particular node;

an error-reporting matrix including horizontal Bus Error Report Lines (BERLs) and vertical Module Error Report Lines (MERLs), said BERLs being associated with said memory buses such that all BIU and MCU nodes sharing an memory bus are connected to a BERLs, said MERLs being associated with said ACD buses such that all nodes sharing an ACD bus are connected to a MERL, and, error-reporting means in said particuar node connected to said means for detecting an error, said error-reporting means including means for receiving error messages transmitted over at least said one BERL, said error messages identifying an error type and identifying the location (module ID) at which the error was detected, a mechanism in said particular node for allowing two identical modules to duplicate the operation of each other, so that if one module fails the other module can be substituted therefor, comprising:

permanent error determining means operative upon the condition that a permanent error type occurs, for causing said error-reporting means in said particular node to propagate a permanent-error type error-report message, said error message identifying thetype of error and the location (module ID) at which the permanent error was detected;

error-report logging means in said particular node connected to at least one of said error-report lines, for logging received error-report messages propagated to said particular node, including permanent error-type messages propagated by another node;

a shadow register, initially set in said particular node to thereby designate said particular node as the primary node in a primary/shadow pair of nodes comprised of said particular node and said other node;

married bit means for storing a married bit, said married bit means being initially set to thereby marry said particular node and said other node as a primary/shadow pair such that each module in said primary/shadow pair is activated to receive data directed to said primary/shadow pair;

a logical ID register for registering the physical identification of said particular node;

a spouse ID register for registering the physical identification of said other node; and, means connected to said error-report logging means, to said logical ID register, and to said spouse ID register for comparing said module ID in said error-report message with said spouse ID in said spouse ID register and with said physical ID in said logical ID register, said comparing means including means for resetting said married bit upon the condition that said module ID and said spouse ID match, such that during normal operation the primary/shadow pair operate as a single logical module, to provide a complete and current backup for each other, said primary module in the air being the active module, while said other module is passive, initially, for a first bus transaction, whereby by tracking the active module, the passive module is able to maintain exactly the same state information as the active module, the roles of active and passive module being interchanged after each bus transaction, whereby resetting the married bit will cause a module to be active on every access instead of alternating with its partner so that said active module will mask the failure of its spouse; said comparing means further including means for disabling said node upon the condition that said module ID in said error-report message and said logical ID match, thus identifying said node as the source of the error.

* * * * *